United States Patent
Munzing

[15] 3,670,115
[45] June 13, 1972

[54] CURRENT COLLECTOR FOR VEHICLES OF ELECTRIC TOY AND MODEL RAILROAD INSTALLATIONS

[72] Inventor: Robert Munzing, Nurnberg, Germany
[73] Assignee: Mas Ernst, Nurnberg, Germany
[22] Filed: June 8, 1970
[21] Appl. No.: 44,486

[30] Foreign Application Priority Data

June 6, 1969 Germany...................P 19 28 825.6

[52] U.S. Cl. ....................................191/45 R, 46/217
[51] Int. Cl. ........................B60l 5/00, B60l 9/02, B60l 9/16
[58] Field of Search..............191/45, 49; 104/148; 46/217, 46/243

[56] References Cited

UNITED STATES PATENTS

| 3,076,288 | 2/1963 | Ernst | 46/217 |
| 476,985 | 6/1892 | Edison | 191/45 R |
| 1,383,037 | 6/1921 | Studstill | 191/45 R |
| 2,685,621 | 8/1954 | Callender | 191/45 R |

*Primary Examiner*—Drayton E. Hoffman
*Attorney*—Walter Becker

[57] ABSTRACT

A rail vehicle for toy and model railroads in which a helical thin electrically conductive spring wire has one end in sliding engagement with an electrically conductive wheel axle having an electrically conductive railroad wheel mounted thereon, whereas the other end of said helical spring wire is in electrical engagement with a plate adapted to be connected to an electric current consumer.

5 Claims, 3 Drawing Figures

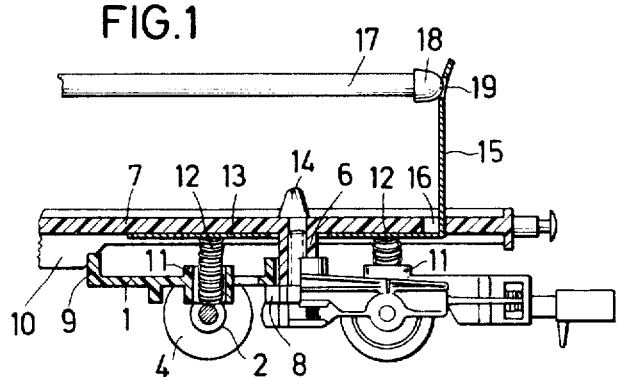
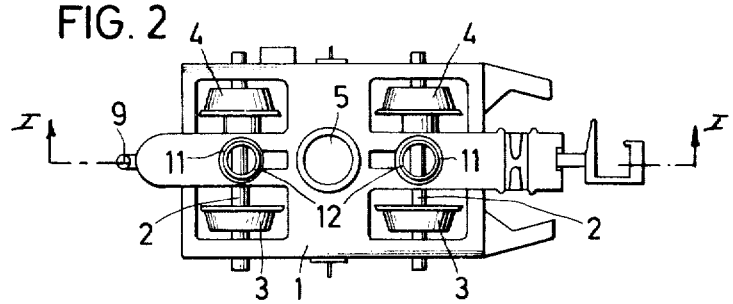
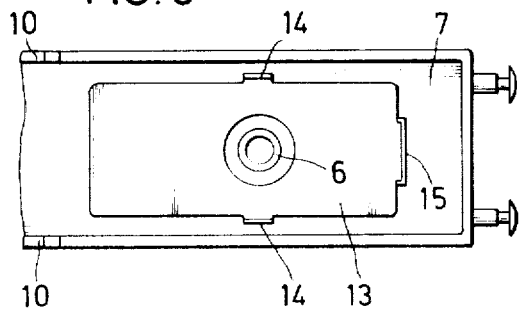

CURRENT COLLECTOR FOR VEHICLES OF ELECTRIC TOY AND MODEL RAILROAD INSTALLATIONS

The present invention relates to a current collector for vehicles of electric toy and model railroad installations. It is known to supply the vehicles of electric toy and model railroad installations with current through insulated rails on the railroad tracks and through wheels rolling on the tracks. If, for this purpose, both rails are used, it is customary to provide the wheel axles of the vehicles in part on one vehicle side and in part on the other vehicle side with wheels which are insulated or consist of insulated material. For purposes of collecting the current, in such instance leaf springs are provided which are connected to the vehicle bottom or to the bogies and which engage the wheel rim or the wheel axle of the wheels which are electrically conductively connected to the respective rail. With vehicles equipped with bogies, it is additionally necessary to provide correspondingly movable current bridges between the bogies and the vehicle body.

The provision of such sliding contacts as current bridges in the form of leaf springs has, however, various drawbacks. Thus, such leaf springs not only increase the costs of production for such vehicles but they also cause increased friction which is of particular importance when the current collectors provided between the wheel axles and the vehicle bodies are intended to supply current to illuminating means in the interior of the vehicle while each vehicle in such instance has to have at least two such sliding contacts or collectors.

It is, therefore, an object of the present invention to provide a current collector for vehicles of electric toy and model railroad installations in the form of a sliding contact which resiliently engages a wheel axle and which can be produced at low cost and in a simple manner while causing only minor friction and assuring a safe current transmission.

It is another object of this invention to provide a current collector as set forth in the preceding paragraph, which will also be suitable as current bridge with vehicles equipped with bogies.

These and other objects and advantages of the invention will appear more clearly from the following specification in connection with the accompanying drawing, in which:

FIG. 1 illustrates a portion of an understructure of a toy vehicle equipped with current collectors according to the present invention and also equipped with bogies and an illuminating device, FIG. 1 being a section along the line II–II of FIG. 1.

FIG. 2 is a top view of the structure shown in FIG. 1.

FIG. 3 illustrates a portion of the vehicle bottom side of the vehicle of FIG. 1 but with the bogie omitted.

The current collector according to the present invention is characterized primarily in that the sliding contact or collector comprises a thin spring wire in the form of a helical spring, which wire has an end face resting on the wheel axle, said sliding contact being supported by the vehicle.

More specifically, with vehicles equipped with bogies, it is suggested in conformity with the present invention, in the vicinity of the bogies, to provide the vehicle bottom side with a contact plate, and in the bogies above each wheel axle to provide an insulating sleeve while a helical spring is arranged in the sleeve so that the two helical springs have their lower end face respectively rest on the two wheel axles while their upper end faces rest against the common contact plate.

The problem with the illustrated embodiment consists in supplying the illuminating installation in the toy passenger cars with current through the wheel axles of the two bogies from both rails. With a railroad installation operated with direct current, this may be effected, for instance, by superimposing a medium frequency alternating voltage upon the direct voltage applied to the rails for the driving operation, while the frequency of the alternating voltage is selected of such a magnitude that it will not affect the driving operation and while the alternating voltage is selected of such a magnitude that it will be able to illuminate a number of serially arranged incandescent lamps in a passenger car. In this way, the cars of a slow passenger train or of a rapid passenger train can be illuminated independently of the driving voltage applied to the rails.

Referring more specifically to the drawing, FIGS. 1–3 show only one end of a toy vehicle rapid passenger car equipped with two bogies. The bogie 1 consisting of a one-piece injected body has two wheel axles 2 which are metallicly conductively connected with the wheels 3 of one side of the vehicle. The wheels 4 of the other vehicle side consist of synthetic material, such as a thermoplast, e.g., polystyrol, so that the wheel axles are electrically insulated with regard to the other side of the tracks. The second non-illustrated bogie is designed similar to that shown in the drawing so that, in view of its image symmetric arrangement on the vehicle body, the location of the wheels 3 and 4 is reversed with regard to the two rails and therefore the wheel axles 2 of this bogie are electrically connected to the other track side. The bogie 1 has a central bore 5 by means of which it is placed onto a hollow pin 6 at the bottom side of the vehicle understructure 7 and is held on said pin by means of a screw 8. A pin 9 extending in upward direction is adapted by engagement with the lower marginal area 10 of the vehicle understructure 7 to limit the lateral movement of the marginal area 10. Precisely above and in the central area of the two wheel axles 2, the bogie 1 is provided with hollow cylindrical guiding bushings 11 in which from above there is inserted one helical spring 12 each of thin round wire of an electrically well conducting material, as for instance, copper bronze, which has slight play in the guiding bushing 11. A contact plate 13 of a material having a good electric conductivity is by means of two pins 14 or ears connected to the vehicle understructure 7 in the vicinity of the hollow pin 6. The length of the helical spring 12 is somewhat greater than the distance between the upper delimination of the wheel axles 2 and the contact plate 13 so that after the bogies have been connected to the vehicle understructure, each of these helical springs will with a slight pressure rest against the corresponding wheel axle 2 and against the contact plate 3. As a result thereof, a good electric connection between the wheel axles 2 and the contact plate 13 is established in a very simple manner which connection neither affects in any material way the pivotal movement of the bogies nor the rotation of the wheel axles.

According to the illustrated embodiment, the contact plate 13 has also an upwardly angled off spring arm 15 which through a cutout 16 in the vehicle understructure 7 extends into the interior of the car. The spring arm 15 together with a similar spring arm on the other vehicle side serves for conveying current to an illuminating installation below the ceiling of the car and simultaneously for holding the illuminating installation. According to the illustrated embodiment, this illuminating installation comprises a transparent wide tube 17, for instance, of a synthetic material, such as teflon, having a number of small cylindrical incandescent lamps arranged in series in the tube 17. The current supply to the incandescent lamps is effected through metal capsules 18 which are located at both ends of the tube 17 and which are inserted into cutouts 19 at the ends of the spring arms 15.

It is, of course, to be understood that the present invention is, by no means, limited to the particular embodiment shown in the drawing but also comprises any modifications within the scope of the appended claims. Thus, the current collector according to the invention may also be used in connection with cars which have no bogies, in other words, are provided with fixed wheel axles, and can furthermore be used in connection with cars having other current consumers than incandescent lamps, for instance, with self-propelled vehicles.

What I claim is:

1. For use in connection with toy and model railroads, a rail vehicle having a bottom, which includes: electrically conductive axle means supported by said vehicle and located below said bottom, wheels supported by said axle means and including electrically conductive wheels electrically connected to said electrically conductive axle means, electrically conductive helical spring means interposed under slight preload between said bottom and said axle means and in electric contact with said axle means, said axle means being adapted to pick up current through said electrically conductive wheels, said helical spring means being electrically connectable to a current consumer, said bottom including electrically conductive contact plate means electrically connected to said helical spring means.

2. A rail vehicle according to claim 1, which includes sleeve means of electrically insulating material surrounding said helical spring means and supported by said vehicle.

3. A rail vehicle according to claim 1, in which said contact plate means has upwardly extending arms in spaced relationship to each other, and illuminating means detachably inserted into said arms.

4. For use in connection with toy and model railroads, a rail vehicle having a bottom, which includes: electrically conductive axle means supported by said vehicle and located below said bottom, wheels supported by said axle means and including electrically connected to said electrically conductive axle means, electrically conductive helical spring means interposed under slight preload between said bottom and said axle means and in electric contact with said axle means, said axle means being adapted to pick up current through said electrically conductive wheels, said helical spring means being electrically connectable to a current consumer, at least two bogies with two axles each, and said bottom including electrically conductive contact plate means electrically connected to said helical spring means.

5. A rail vehicle according to claim 4, in which one axle of a bogie is electrically insulated with regard to the wheels of one side of said bogie and belonging to said one bogie, and in which the other axle of the same bogie is electrically insulated with regard to the wheels on the other side of said same bogie.

* * * * *